United States Patent
Shirahatti et al.

(10) Patent No.: US 10,104,589 B2
(45) Date of Patent: Oct. 16, 2018

(54) APPARATUS, SYSTEMS AND METHODS FOR SYSTEM SELECTION AND RESELECTION

(71) Applicant: APPLE INC., Cupertino, CA (US)

(72) Inventors: Harsha Shirahatti, Santa Clara, CA (US); Umesh K Shukla, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/091,316

(22) Filed: Apr. 5, 2016

(65) Prior Publication Data

US 2017/0289886 A1 Oct. 5, 2017

(51) Int. Cl.
*H04W 36/20* (2009.01)
*H04W 36/30* (2009.01)
*H04W 48/20* (2009.01)
*H04W 72/10* (2009.01)

(52) U.S. Cl.
CPC ........... *H04W 36/20* (2013.01); *H04W 36/30* (2013.01); *H04W 48/20* (2013.01); *H04W 72/10* (2013.01)

(58) Field of Classification Search
CPC .................................................... H04W 36/20
USPC ................................................ 455/431–435
See application file for complete search history.

(56) References Cited

U.S. PATENT DOCUMENTS

| | | | |
|---|---|---|---|
| 8,711,767 B2 * | 4/2014 | Balasubramanian | ........................ H04J 11/0093 370/328 |
| 9,565,685 B2 * | 2/2017 | Homchaudhuri | ... H04W 72/082 |
| 2012/0214494 A1 * | 8/2012 | Awoniyi | ............... H04W 88/10 455/439 |
| 2014/0011502 A1 * | 1/2014 | Moilanen | .......... H04W 36/0061 455/437 |
| 2015/0017985 A1 * | 1/2015 | Safavi | ............... H04W 36/0083 455/436 |

* cited by examiner

*Primary Examiner* — Michael T Vu
(74) *Attorney, Agent, or Firm* — Fay Kaplun & Marcin, LLP

(57) ABSTRACT

Described herein are apparatus, systems and methods for opportunistic system selection and reselection to avoid jammer desense intermodulation distortion. A method may comprise, at a user equipment ("UE"), identifying a list of frequencies and bands available to a cellular modem of the UE for one of system selection and system reselection, identifying a subset of the list of frequencies and bands based on an operation of a non-cellular wireless communication component of the UE, storing the subset of the list of frequencies and bands in a graylist, and performing, by the cellular modem, a search for one of the system selection and the system reselection based on the graylist.

21 Claims, 9 Drawing Sheets

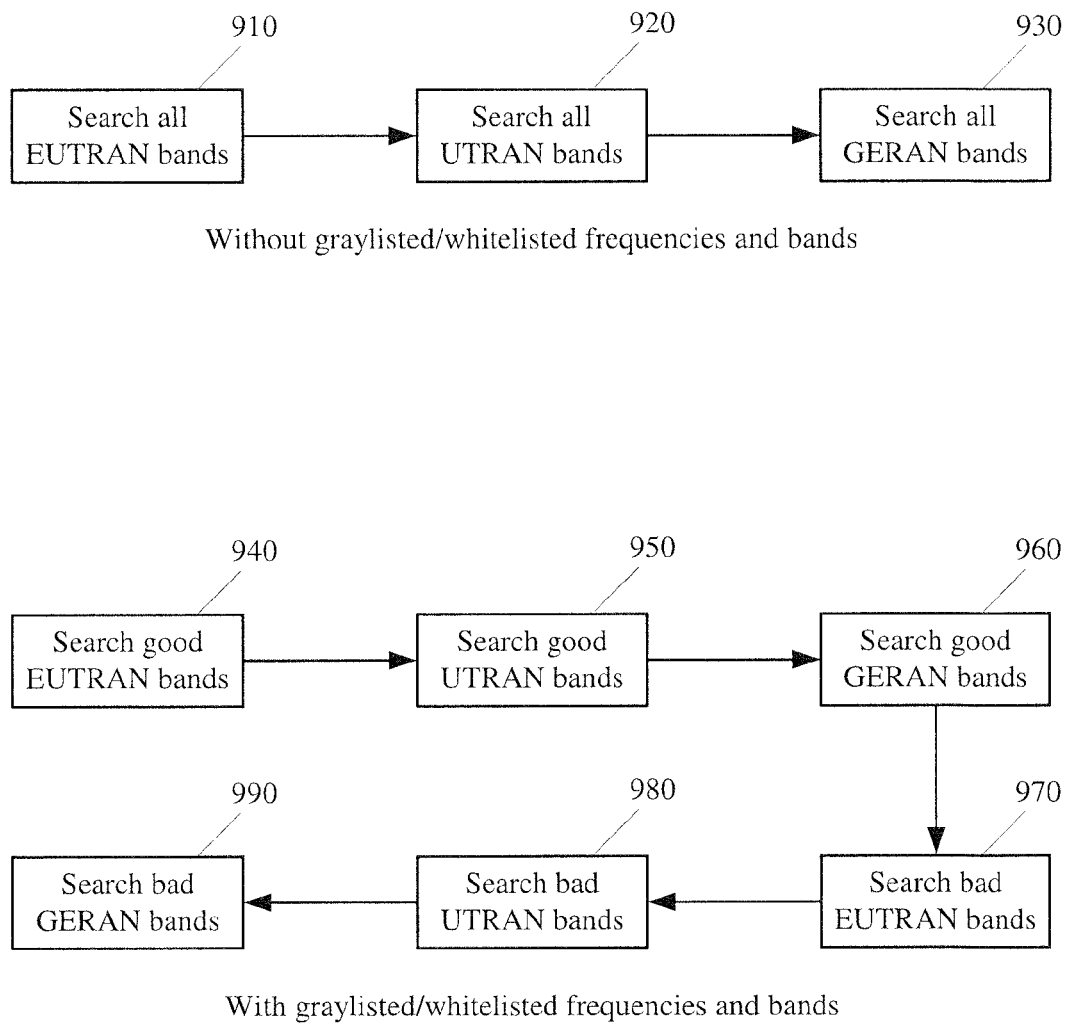

… (1)

APPARATUS, SYSTEMS AND METHODS FOR SYSTEM SELECTION AND RESELECTION

BACKGROUND

Wireless communication systems are rapidly growing in usage. Further, wireless communication technology has evolved from voice-only communications to also include the transmission of data, such as Internet and multimedia content. A user equipment ("UE") may be configured to establish a connection with different types of networks through the use of wireless communications protocols. Accordingly, based upon the capabilities of the hardware and software of the UE, the connection may be made with these different types of networks. For instance, the network may be a Universal Mobile Telecommunication System ("UMTS") or Long Term Evolution ("LTE") network for data connectivity, or the network may be a Global System for Mobile Communications ("GSM") or Code Division Multiple Access ("CDMA") network for voice connectivity. Furthermore, each of these networks may utilize different radio access standards, such as evolved UMTS Terrestrial Radio Access Network ("EUTRAN"), Universal Terrestrial Radio Access Network ("UTRAN"), and GSM EDGE Radio Access Network ("GERAN").

LTE, commonly referred to as a "4G LTE," is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols or 2G/3G networks, such as GSM/UMTS protocols and CDMA 2000 1x (e.g., 1xRTT or simply "1x") wireless communication protocols. In addition, standards are being developed for new 5G networks. Each of these different types of networks and protocols may be termed radio access technologies ("RATs").

A UE may be configured to communicate wirelessly with a network by associating with a base station ("BS") of the network. The UE may include a network application that is executed to perform this functionality of joining the network and associating with the BS. The network may operate using a predetermined RAT. When more than one network and/or more than one BS is available for association in a given location of the UE, the UE may connect to any one of these BSs as long as the UE is configured to operate on the corresponding RAT.

Prior to joining a network, the UE may perform a full band scan to identify any available networks at the location that the UE is disposed. However, depending on the geographic location such as a country, the RATs used by the various networks may operate on a wide range of channels (e.g., group of continuous frequencies). The wide range of channels available to the UE may lead to performance issues such as jammer desense, in-band interference, inter-modulation distortion and interference from other bands.

SUMMARY

Described herein are apparatus, systems and methods for opportunistic system selection and reselection to avoid jammer desense intermodulation distortion.

A method may comprise, at a user equipment ("UE"), identifying a list of frequencies and bands available to a cellular modem of the UE for one of system selection and system reselection, identifying a subset of the list of frequencies and bands based on an operation of a non-cellular wireless communication component of the UE, storing the subset of the list of frequencies and bands in a graylist, and performing, by the cellular modem, a search for one of the system selection and the system reselection based on the graylist. As will be described in greater detail below, the graylist may include a subset of available frequencies and bands that are to be avoided, de-prioritized, or otherwise restricted for use by the UE to minimize interference and antenna desense.

Also described herein is a user equipment ("UE") device comprising a cellular modem, a non-cellular wireless communication component, a non-transitory memory having a program stored thereon, and a processor. Furthermore, execution of the program causes the processor to perform operations comprising identifying a list of frequencies and bands available to the cellular modem for one of system selection and system reselection, and sending a subset of the list of frequencies and bands to the cellular modem based on an operation of the non-cellular wireless communication component. Furthermore, the cellular modem stores the subset of the list of frequencies and bands in a graylist, and performs a search for one of the system selection and the system reselection based on the graylist.

Further described herein is a user equipment ("UE"), comprising a processor, a memory, a non-cellular wireless communication component, and a cellular modem that performs a first cell selection search when a interference avoidance function is enabled and a second cell selection search when the interference avoidance function is disabled, wherein the first cell selection search is based on an operation of the non-cellular wireless communication component.

BRIEF DESCRIPTION OF THE DRAWINGS

FIG. 9 shows an exemplary method for performing a split search on the same RAT frequencies according to various embodiments described herein.

DETAILED DESCRIPTION

Figure 1:
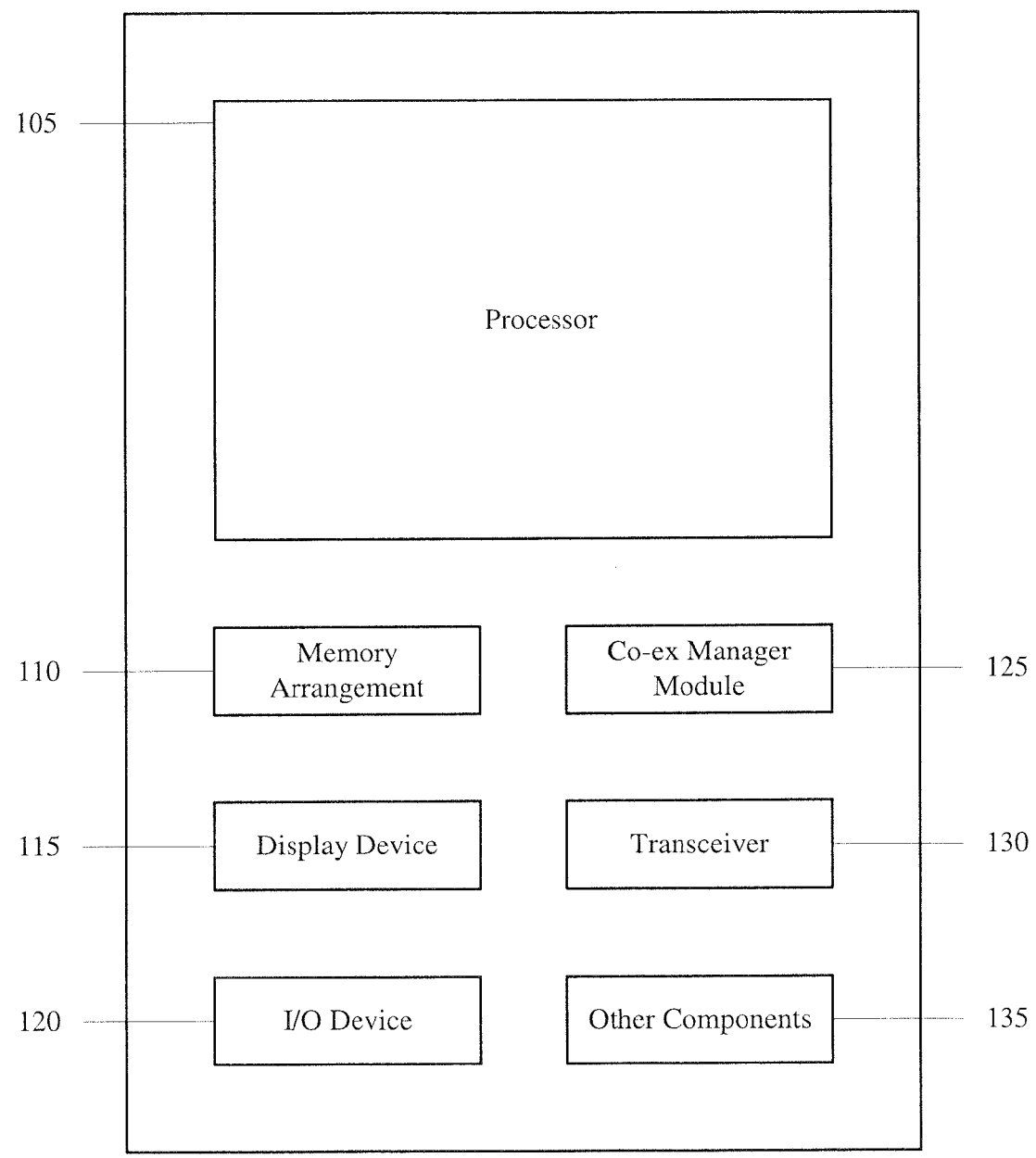
FIG. 1 shows a mobile device, such as the UE, in a communication with a plurality of wireless networks, according to various embodiments described herein.

The exemplary embodiments may be further understood with reference to the following description and the appended drawings, wherein like elements are referred to with the same reference numerals. The exemplary embodiments describe an apparatus, system and method for opportunistic system selection and reselection to avoid performance issues such as desense, intermodulation distortion and other jammer desense interference.

Those skilled in the art would understand that desense refers to the loss of antenna sensitivity due to noise sources. Furthermore, intermodulation distortion, or IMD, describes scenarios where two or more signals of different frequencies are mixed together and additional signals are formed at frequencies that may not be at harmonic frequencies of the source signal. Intermodulation may create desense on bands associated with Global Navigation Satellite Systems ("GNSS"). In one specific example, GNSS may experience huge desense when certain bands on EUTRAN are active and transmitting. Furthermore, desense may also be created when the UE is camped on certain bands and transmitting along with WiFi. It should be noted that while the exemplary embodiments are described with reference to solving performance issues such as desense and intermodulation distortion, the exemplary embodiments may also solve other types of performance issues.

To provide one example of in-band interference, the frequency of the LTE B13 Second Harmonic band lies very close to that of the Global Positioning System band. This may cause significant interference if the LTE B13 is transmitting at a high power. When other GNSS, such as the BeiDou Navigation Satellite System, are supported, then the B13 Second Harmonic may be an in-band interference. Accordingly, this may result in performance issues where the BeiDou system is the primary satellite constellation.

In addition to in-band interference, there is an intermodulation distortion between the LTE B13 LO and certain resource block ("RB") allocations that falls into the band of certain location services, such as the Global Positioning System ("GPS") band, thereby causing a great deal of interference. It should be noted that there may other cases of intermodulation distortion between various technologies (e.g., WCDMA, WiFi, etc.), and these technologies may also interfere within the GPS band. Furthermore, there are other cases of interference from known bands that may be neither an intermodulation distortion nor a Second Harmonic interference, such as the LTE B13 band.

Such interferences may have a significant impact on UE performance and the overall user experience. Interference in the GPS band may result in position outliers and poor map experience during navigation in tough GNSS conditions (e.g., downtown and urban environments, foliage conditions, etc.). Furthermore, if the GNSS on the UE is being used and communication is established over WiFi in the presence of WCDMA, the resulting interference may affect the performance of any GNSS-related applications (e.g., CarPlay). If the interference is strong enough, especially on smaller form factors, it may result in a total loss of any GNSS solutions. In addition, since E911 operating on a Voice over LTE ("VOLTE") system will work on an EUTRAN network, the above-described interference may affect the positioning calculations during an emergency call. In other words, the above-described interference may affect the true location calculation of the caller during an emergency call. It may be noted that while an exemplary embodiment may disable the selection/reselection logic during an emergency mode, this logic may be reactivated in the future.

In the exemplary embodiments, the mobile device will be described as a UE associated with EUTRAN networks. However, it will be understood by those skilled in the art that UEs operating in accordance with other network standards may also implement the exemplary embodiments in accordance with the functionalities and principles described herein.

According to the exemplary embodiments, the devices, systems and methods described herein provide for opportunistic system selection and reselection. For instance, the devices, systems and methods may allow for a cellular modem of an exemplary UE to avoid interference scenarios associated with antenna desense, intermodulation distortion or any other jammer desense. The UE utilizes a system selection mechanism that is applicable to power up and idle mode states. A coexistence, or co-ex, manager may also send a distress signal to the modem in the event of poor reception, wherein the handling of the distress signal may include a re-running of power-up system selection mechanisms.

Accordingly, the modem may initiate the exemplary reselection mechanism to move away from certain frequencies and bands (e.g., graylisted frequencies and bands). As will be described in greater detail below, the graylisted frequencies and bands may include a subset of available frequencies and bands that are avoided, de-prioritized, or otherwise restricted for use to minimize interference and antenna desense at the exemplary UE. For instance, a graylist may feature a subset of the frequencies and bands available to a cellular modem, wherein the subset is based on an operation of a non-cellular wireless communication component of the UE. Furthermore these system selection and reselection mechanisms may also be enabled based on device use-cases in real time (e.g., pedestrian mode, fitness tracking mode, etc.) that may require more accurate GNSS tracking of the UE.

FIG. 1 shows an exemplary UE 100 according to various embodiments described herein. The UE 100 may represent any electronic device that is configured to perform wireless functionalities described herein. Accordingly, the UE 100 may be a portable device such as a smartphone, a tablet, a phablet, a laptop, a wearable, etc. In another example, the UE 100 may be a client stationary device such as a desktop terminal. The UE 100 may be configured to perform cellular and/or WiFi functionalities. The UE 100 may include a processor 105, a memory arrangement 110, a display device 115, an input/output (I/O) device 120, a co-ex manager module 125 a transceiver 130, and other components 135. The other components 135 may include, for example, an audio input device, an audio output device, a battery, a data acquisition device, ports to electrically connect the UE 100 to other electronic devices, etc.

The processor 105 may be configured to execute a plurality of applications of the UE 100. It should be noted that the above noted applications each being an application (e.g., a program) executed by the processor 105 is only exemplary. The functionality associated with the applications may also be represented as a separate incorporated component of the UE 100 or may be a modular component coupled to the UE 100, e.g., an integrated circuit with or without firmware. In addition, in some UEs, the functionality described for the processor 105 is split among two processors, a baseband processor and an application processor ("AP"). The exemplary embodiments may be implemented in any of these or other configurations of a UE.

The memory 110 may be a hardware component configured to store data related to operations performed by the UE 100. Specifically, the memory 110 may store data related to various applications. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The UE 100 may be configured to communicate directly with one or more networks, such as an EUTRAN network, a legacy radio access network ("RAN"), a WiFi network, etc. One skilled in the art would understand that exemplary legacy RANs may include a circuit switched network, e.g., GSM, UMTS, CDMA, 1×RTT, 1×, etc. With regards to the exemplary embodiments, the UE 100 may establish a connection with the EUTRAN to, among other functionalities, perform data transfers, voice calls and exchange SMS messages with the EUTRAN network.

The transceiver 130 may be a hardware component configured to transmit and/or receive data. That is, the transceiver 130 may enable communication with other electronic devices directly or indirectly through one or more networks based upon an operating frequency of the network. The transceiver 130 may operate on a variety of different frequencies or channels (e.g., set of consecutive frequencies) that are related to the VoLTE call functionality. Thus, one or more antennas (not shown) coupled with the transceiver 130 may enable the transceiver 130 to operate on the EUTRAN frequency band as well as over a WiFi network. Accordingly, the transceiver 130 may include any number of components such as a cellular modem and non-cellular wireless communication components, such as a WiFi modem, a GNSS receiver, etc.

Figure 2:
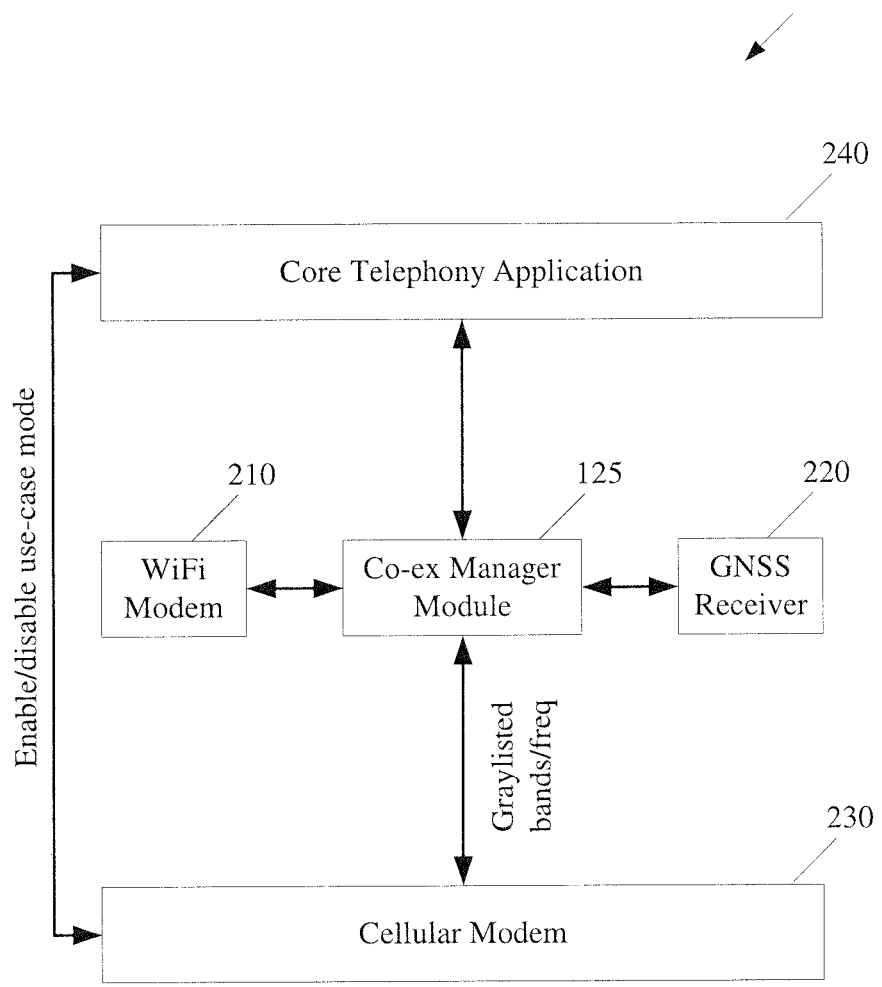
FIG. 2 shows an exemplary system architecture for desense and intermodulation distortion avoidance according to various embodiments described herein.

FIG. 2 shows an exemplary system architecture 200 for desense and intermodulation distortion avoidance according to various embodiments described herein. The architecture 200 includes the co-ex manager module 125, a WiFi modem 210, a GNSS receiver 220, a cellular modem 230 and core telephony application 240 of the exemplary UE 110 described above in FIG. 1.

The co-ex manager module 125 may be used to keep track of active frequencies on the non-cellular wireless communication components, e.g., the WiFi modem 210 and the GNSS receiver 220. In addition, the co-ex manager module 125 may maintain a table of graylisted cellular frequencies for a given list (e.g., GNSS frequency list, WiFi frequency list, etc.) and/or combination of lists. The exemplary cellular modem 230 may then be supplied with the list of graylisted frequencies and band in order to avoid using these frequencies to maintain GNSS and/or WiFi performance. The co-ex manager module 125 may periodically send updated graylisted information to the cellular modem 230 as soon as there is any state change in either the WiFi modem 210 or the GNSS receiver 220. As will be described in greater detail, an exemplary AP of the UE 100 may enable and disable use-case modes at the cellular modem 230 based on the applications running on the UE 100. Accordingly, the cellular modem 230 may then determine which optimization to enable at a given time for a given scenario. It is noted that while the exemplary system architecture 200 includes the WiFi modem 210, the systems and methods described herein are not limited to any specific wireless technology. For instance, the co-ex manager module 125 may consider the operations and frequencies of alternative and/or additional wireless modems, such as Bluetooth.

Figure 3:
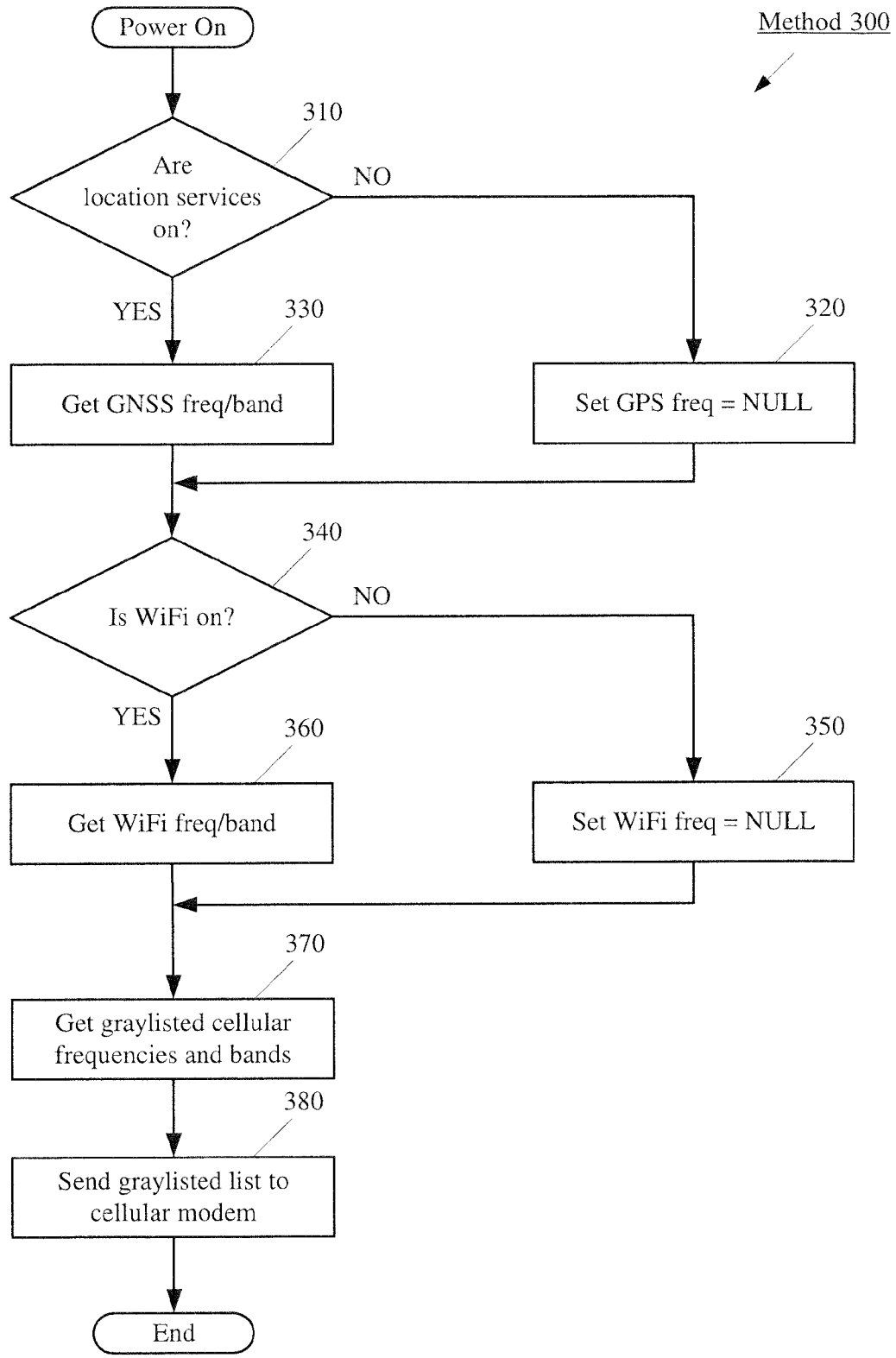
FIG. 3 shows an exemplary method for desense and intermodulation distortion avoidance according to various embodiments described herein.

FIG. 3 shows an exemplary method 300 for operating the co-ex manager module 125 for desense and intermodulation distortion avoidance according to various embodiments described herein. It should be noted that while the exemplary method 300 is described as being performed by the co-ex manager module 125, any combination of hardware and software components of the UE 100, such as, but not limited to the processor 105, a baseband processor, an AP, etc., may be capable performing the methods described herein.

In 310, after powering on the UE 100, the co-ex manager module 125 may determine if the GNSS receiver 220 is operating. It should be noted that while the exemplary embodiments refer to the use of GNSS satellite tracking system, the systems and methods described herein may be implemented on any other GNSS standard or location services, such as, but not limited to GPS, GLONASS, Galileo, BeiDou, IRNSS, etc. If the GNSS receiver 220 is not on, the co-ex manager module 125 may set the GNSS frequency to NULL in 320 and the method 300 may advance to 340. If the GNSS receiver 220 is on, the co-ex manager module 125 may obtain the GNSS frequency and band from the GNSS receiver 220 in 330 and the method 300 may advance to 340.

In 340, the co-ex manager module 125 may determine if the WiFi modem 210 is operating. If WiFi modem 210 is not on, the co-ex manager module 125 may set the WiFi frequency to NULL in 350 and the method 300 may advance to 370. If the WiFi modem 210 is on, the co-ex manager module 125 may obtain the WiFi frequency and band from the WiFi modem 210 in 360 and the method 300 may advance to 370. As noted above, the exemplary embodiments are not limited to WiFi technology or the use of the WiFi modem 210. Accordingly, in 340 the co-ex manager module 125 may examine the operation of an alternative modem, such as a Bluetooth modem.

In 370, the co-ex manager module 125 may compare the GNSS frequency/band and the WiFi frequency/band to predetermined information stored on the UE 100 (e.g., a lookup table stored in memory arrangement) and computes a list of graylisted cellular frequencies and band. In 380, the co-ex manager module 125 may then send the graylisted list to the cellular modem 230 of the UE 100. The usage of the graylisted list will be described in greater detail below. Once again, the exemplary embodiments are not limited to any specific wireless communication components or standards. Accordingly, throughout the method 300, the co-ex manager module 125 may examine the operations and frequencies used by any communication technology that may interfere with the UE 100.

Figure 4:
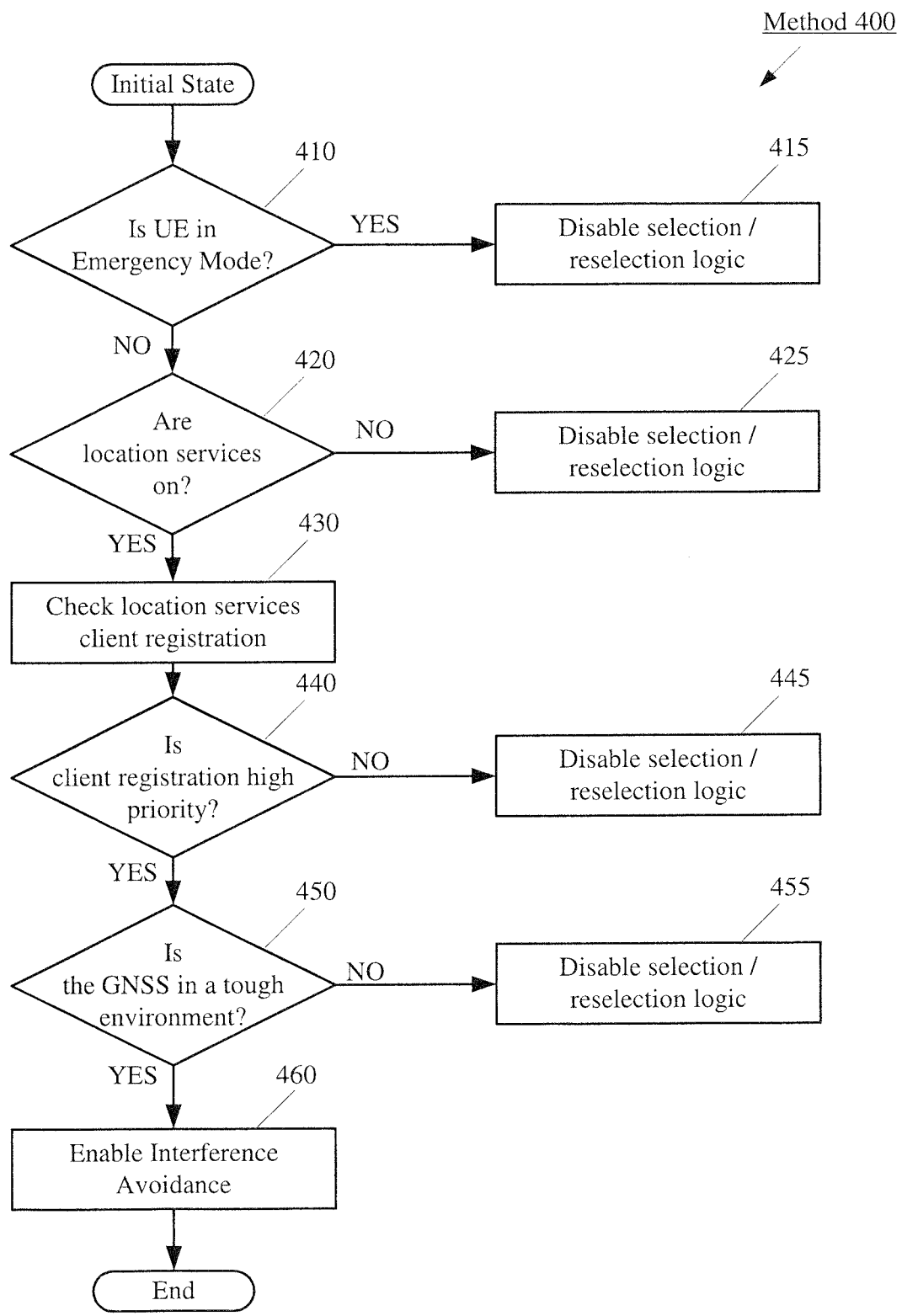
FIG. 4 shows an exemplary method for enabling and disabling the various embodiments described herein.

FIG. 4 shows an exemplary method 400 for enabling and disabling the various embodiments described herein. In 410, the co-ex manager module 125 determines if the UE 100 is in emergency mode. If the UE 100 is in emergency mode, in 415 the co-ex manager module 125 disables the exemplary selection/reselection logic. That is, in emergency mode, the cellular modem 230 may want to have access to all available frequencies/bands so that an emergency call can be connected. Thus, the selection/reselection logic may be disabled. If the UE 100 is not in emergency mode, in 420 the co-ex manager module 125 determines if the GNSS receiver 220 is in operation (e.g., in an activity operating state).

If the GNSS receiver 220 is not on (e.g., actively operating), in 425 the co-ex manager module 125 disables the selection/reselection logic and informs the cellular modem 230 that the logic is disabled. Specifically, with the GNSS receiver 220 off, there is no possibility of interference with the cellular modem 230, and thus, the exemplary selection/reselection logic would not be used. If the GNSS receiver 220 is on, in 430 the co-ex manager module 125 may then check for GNSS client registration. For instance, the GNSS client registration may include registration such as navigation, fitness, etc., each having a type of GNSS client registration. These types of GNSS client registration may include high priority registrations that require accurate GNSS location data. In contrast, the types of GNSS client registration may also include lower priority registrations, such as location services for advertisement serving, web applications for business searching, etc.

In 440, the co-ex manager module 125 may determine if the GNSS client registration is one of high priority. If the GNSS client registration is not high priority, in 445 the co-ex manager module 125 disables the selection/reselection logic and informs the cellular modem 230 that the logic is disabled. If the GNSS client registration is one of high priority, in 450 the co-ex manager module 125 may then obtain the GNSS environment. Specifically, there may be an AP input that provides an indication of the GNSS environment. For instance, a tough GNSS environment may include a location with a dense grouping of obstructions, such as tall buildings in an urban area, foliage in a densely wooded area, etc. Likewise, an easy GNSS environment may feature flat plains and few or low structures. The AP input related to the tough/easy GNSS environment information may be stored GNSS coordinates that have a predictable history of being either a tough or an easy GNSS environment (e.g., the GNSS coordinates of an approaching city).

If the GNSS environment is not considered to be a tough environment, in 455 the co-ex manager module 125 disables the selection/reselection logic and informs the cellular modem 230 that the logic is disabled. If the GNSS environment is considered to be a tough environment, in 460 the co-ex manager module 125 may then enable the interference avoidance algorithm. It may be noted that while the method 400 includes the disabling of the selection/reselection logic in four instances (415, 425, 445, and 455), alternative scenarios may exist for disabling the logic. Furthermore, each of the scenarios described above may optionally maintain the operation of the logic. For instance, the UE 100 operating in the emergency mode may maintain the selection/reselection logic to provide location information during an emergency. In addition, it should be understood that the method 400 may be continuously performed to enable and disable the selection/reselection logic as needed.

Figure 5:
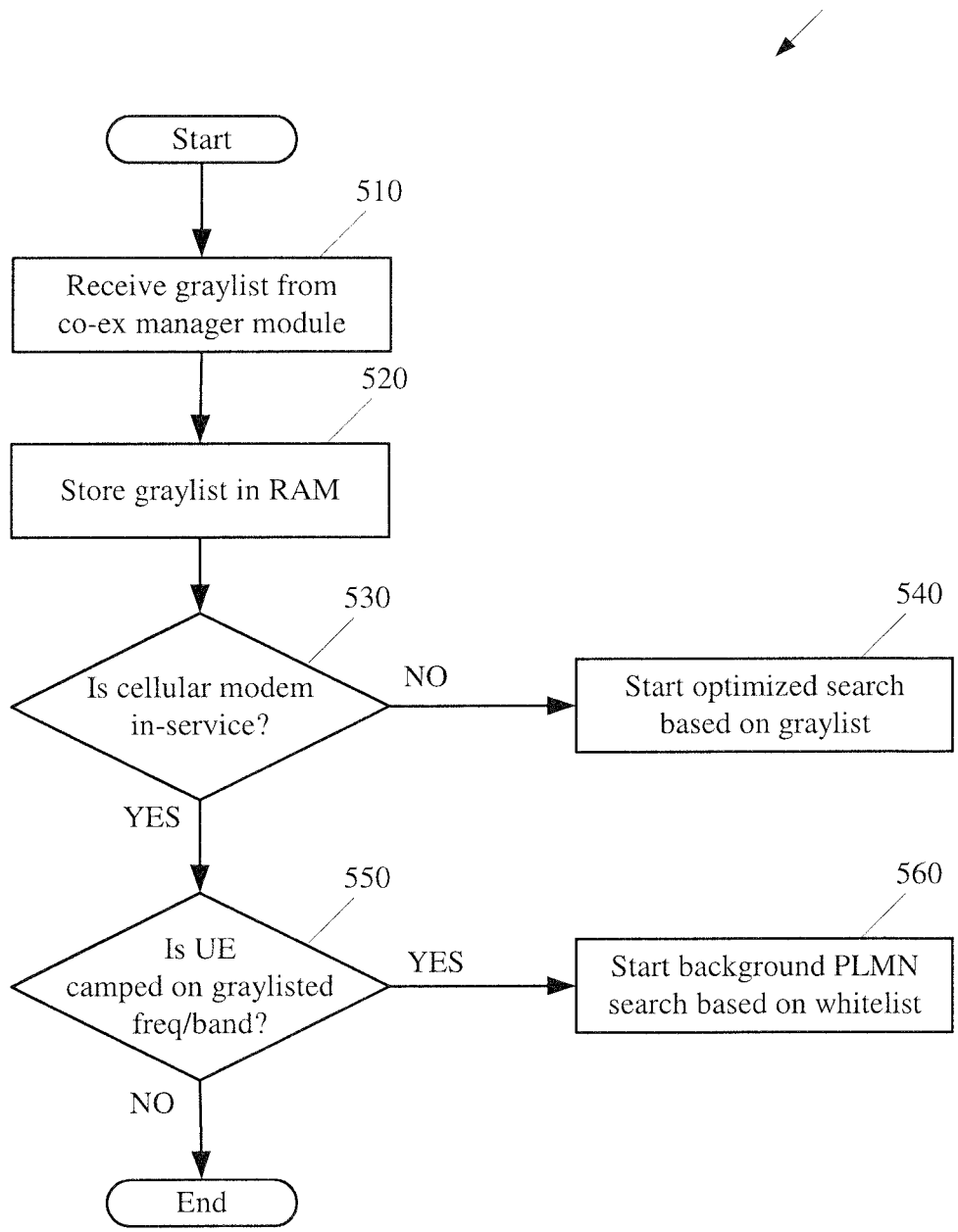
FIG. 5 shows an exemplary method for performing cellular optimization to various embodiments described herein.

FIG. 5 shows an exemplary method 500 for performing cellular optimization to various embodiments described herein. More specifically, the exemplary method 500 may allow for the UE 100 to perform opportunistic system selection and reselection by identifying a graylist of frequencies and bands available to the UE 100 during the system selection/reselection process, and thus avoiding jammer desense, in-band interference, inter-modulation distortion, etc.

In 510, the cellular modem 230 of the UE 100 receives the graylist from the co-ex manager module 125. In 520, the processor 105 of the UE 100 may store the graylist information in the memory arrangement 110 (e.g., RAM storage). In 530, the processor 105 may determine if the cellular modem 230 is in-service. If the cellular modem 230 is not in-service, in 540 the processor 105 may start an optimized search based on the graylisted list of frequencies/bands. If the cellular modem 230 is in-service, the method 500 may advance to 550.

In 550, the processor 105 may determine if the UE 100 is camped on a cell that uses a graylisted frequency/band. If the UE 100 is not camped on such a cell, in 560 the UE 100 may maintain its current connection. If the UE 100 is camped on such a cell, in 570 the processor 105 may initiate a background public land mobile network ("PLMN") search on non-graylisted frequencies (e.g., whitelisted frequencies). The exemplary whitelisted bands may be described as the total available bands after either removing or de-prioritizing the graylisted bands.

Figure 6:
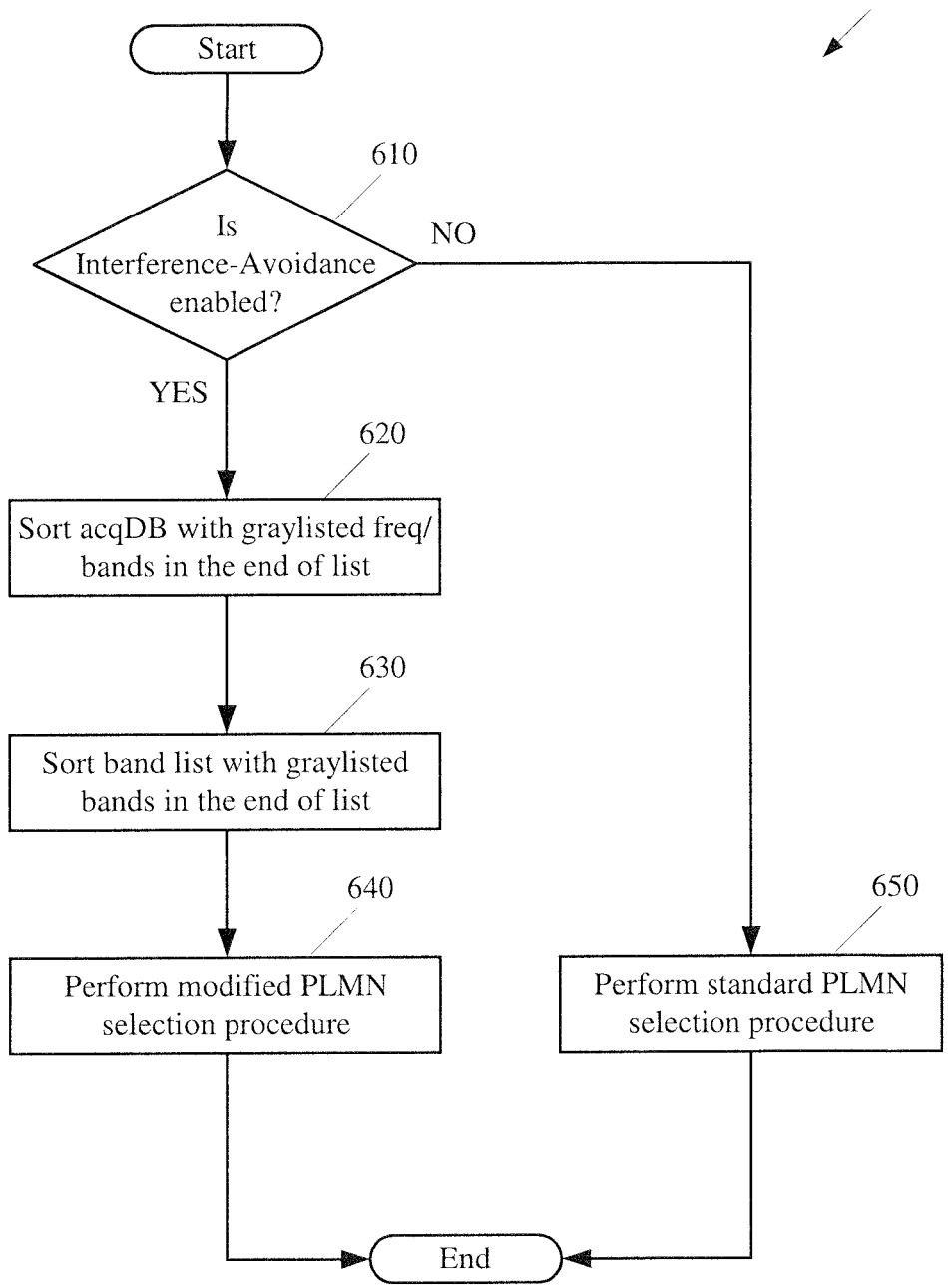
FIG. 6 shows an exemplary method for avoiding graylisted frequencies during absolute priority reselection according to various embodiments described herein.

FIG. 6 shows an exemplary method 600 for avoiding graylisted frequencies during absolute priority reselection according to various embodiments described herein. As discussed above, the cellular modem 230 may be supplied with a list of graylisted frequencies and bands from the co-ex manager module 125. Therefore, the UE 100 should avoid these frequencies and band in order to maintain satisfactory GNSS performance.

According to one embodiment, these graylisted frequencies may be put at the end of an acquisition database ("acqDB"), while the whitelisted frequencies may be located at the top of the acqDB. For instance, the cellular modem 230 may search the LTE band 17 E-UTRA Absolute Radio Frequency Channel Number ("EARFCN") first and band 13 EARFCN later. Furthermore, the graylisted frequencies and bands may be searched at the very end of the acqDB based on order of severity. The search of the acqDB may take place at device power up, changes in antenna usage (e.g., airplane mode toggle), out of service ("OOS") recovery scenarios, etc.

Method 600 may follow the completion of method 400 discussed above. Accordingly, in 610, the processor 105 may determine if the interference avoidance algorithm was enabled. If the interference avoidance algorithm was not enabled, the method 600 may advance to 650 wherein the processor 105 may initiate a standard background PLMN search. If the interference avoidance algorithm was enabled, in 620 the processor 105 may sort the acqDB frequencies such that the graylisted frequencies are placed at the end of the list. Thus, in this method, the graylisted frequencies are searched, but in order of desirability.

In 630 the processor 105 may sort the band list such that the graylisted bands are placed at the end of the list. In 640 the processor 105 may initiate a modified background PLMN search based on the newly sorted acqDB list, wherein the graylisted frequencies and bands are de-prioritized in favor of the non-graylisted frequencies (e.g., whitelisted frequencies). In other words, as opposed to the standard PLMN selection procedure performed in 650, a search in the modified PLMN selection procedure in 640 may be performed in the order of the sorted lists frequencies and bands.

Figure 7:
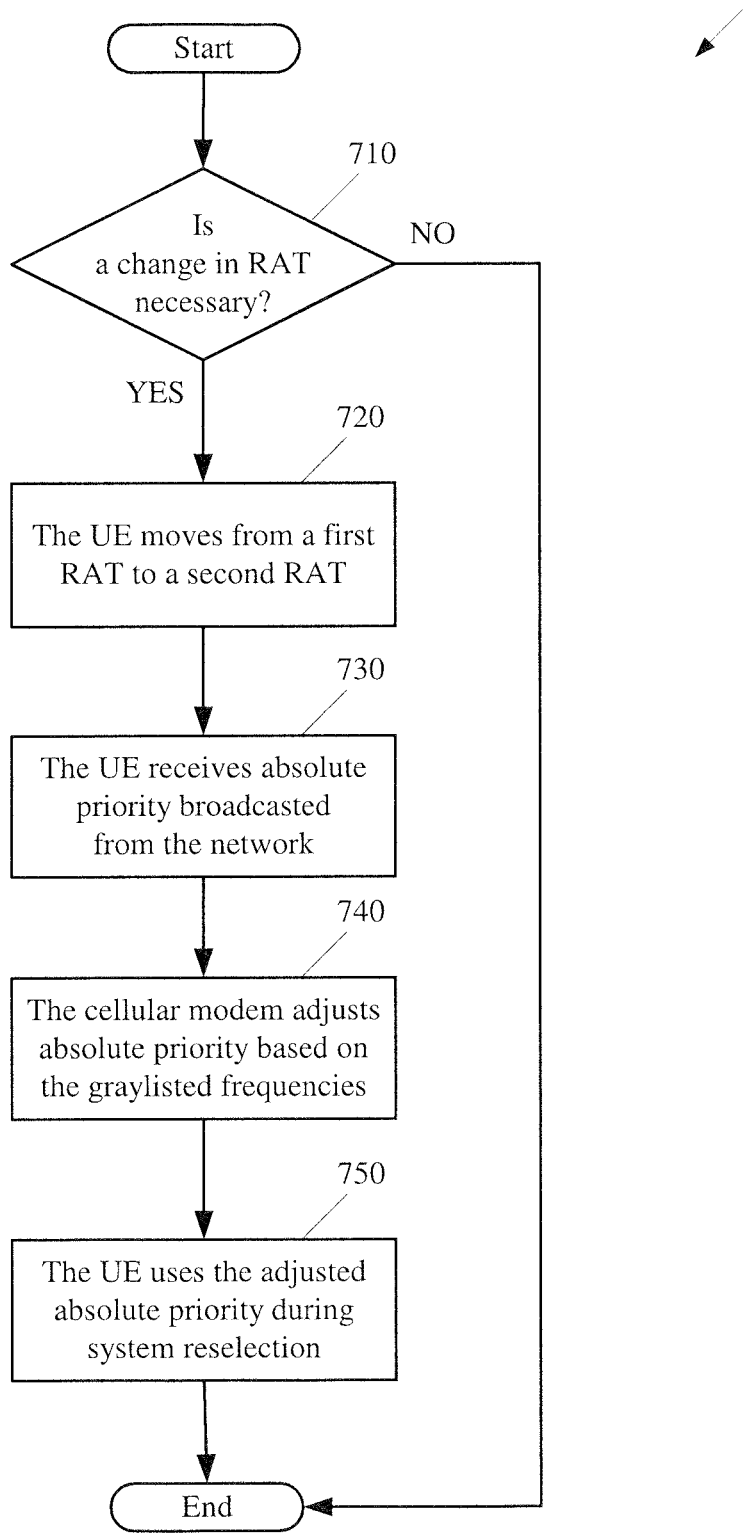
FIG. 7 shows an exemplary method for deprioritizing graylisted frequencies stored in the acquisition database according to various embodiments described herein.

FIG. 7 shows an exemplary method 700 for deprioritizing graylisted frequencies stored in the acquisition database according to various embodiments described herein. According to the exemplary method 700, in 710 the UE 100 may determine whether a change in RAT is necessary. For instance, the UE 100 may use absolute priority reselection to move between RATs (e.g., UMTS/GSM to LTE) while in idle mode. If there was no change in RAT, the method 700 may end. If there was a change in RAT, the method 700 may advance to 720.

In 720, the UE 100 transition from its initial RAT to a different RAT. For instance, a common scenario may involve the UE 100 moving from EUTRAN to UMTS for a CSFB call. In 730, the UE 100 receives absolute priorities of each EARFCN that are broadcasted by the network in system information.

In 740, the cellular modem 230 may adjust and assign low absolute priority to graylisted frequency layers and high absolute priority to benign frequencies. This priority adjustment may be performed such that relative priority among graylisted frequencies and whitelisted frequencies remain maintained. In addition, this optimization may be triggered based on use cases, as discussed above. For instance, if a wearable device is operating in pedestrian mode, this optimization may be enabled. However, if a user of the device is simply checking messages, this optimization may not be enabled.

In 750, the UE 100 may then use the adjusted absolute priority of EARFCNs to determine the reselection candidates during the system reselection process. It is noted that signal strength may not be considered criteria for initializing reselection, as this may have an adverse impact on the performance of the cellular modem 230.

Figure 8:
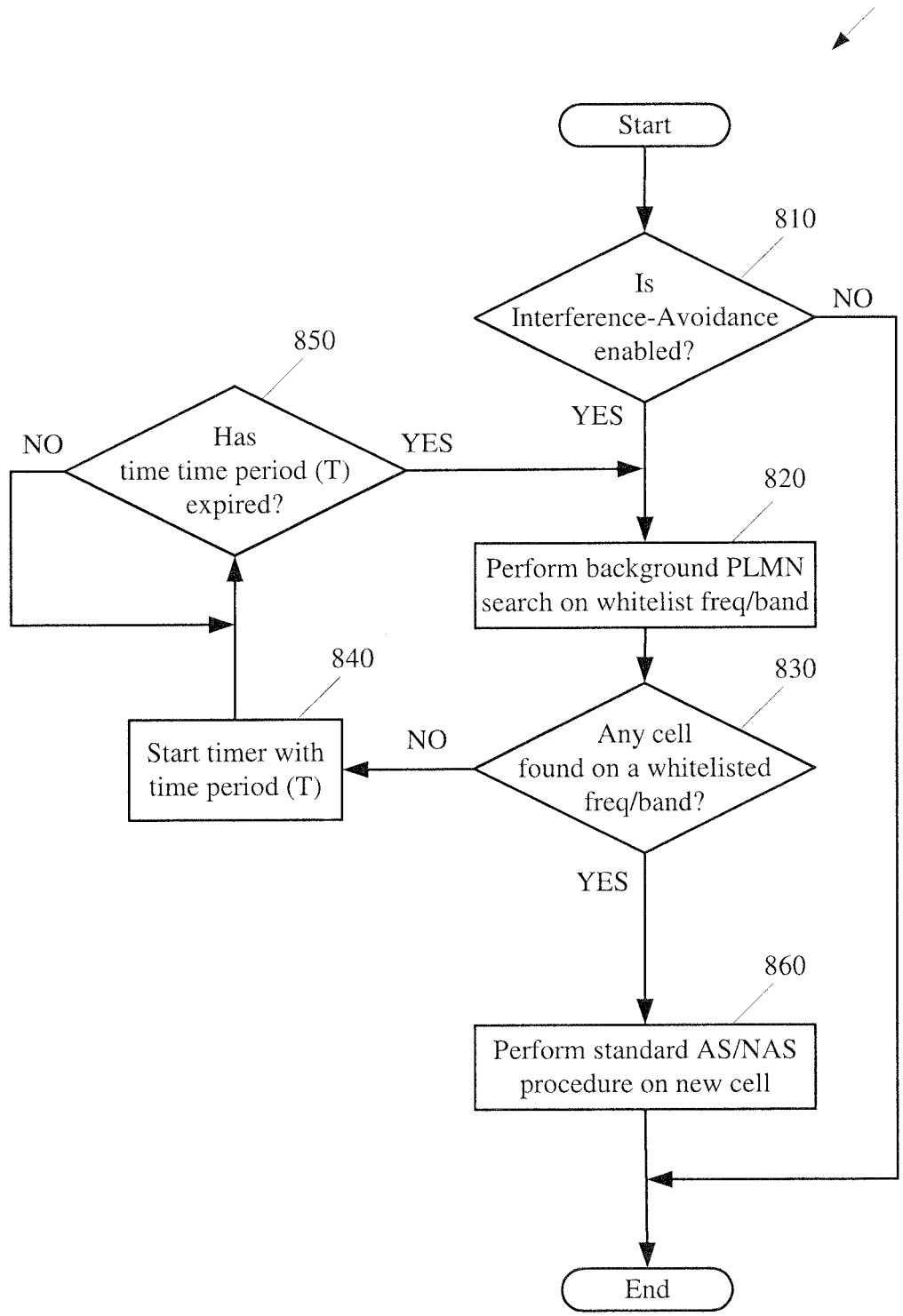
FIG. 8 shows an exemplary method for background searching for frequencies according to various embodiments described herein.

FIG. 8 shows an exemplary method 800 for background searching for frequencies according to various embodiments described herein. Specifically, the UE 100 may perform a background PLMN search for good, or whitelisted frequencies and bands when the UE 100 is camped on graylisted frequencies. Accordingly, when the UE 100 is camped on graylisted frequencies, the scans for good frequencies may not cause any OOS, page-miss or any other cellular degradation (e.g., key performance indicator ("KPI") degradation). The UE 100 may scan whitelisted frequencies and bands in a designated order or priority, such as the acqDB, then neighboring frequencies from system information, then allowed bands, etc.

Once an appropriate whitelisted frequency is found, the UE 100 may camp on a new cell and send attach/location update/tracking area update request as per 3GPP protocol. It may be noted that this optimization may apply to both domestic and roaming scenarios. For instance, in a domestic case, targeted PLMN in background scan may be the same as a camped PLMN. However, the scan may now include the new whitelisted frequencies.

In 810, the processor 105 may determine if the interference avoidance algorithm was enabled. If the interference avoidance algorithm was not enabled, the method 800 may end. If the interference avoidance algorithm is enabled, in 820 the processor 105 may perform a background PLMN search on whitelisted frequencies and bands.

In 830, the processor 105 may determine whether a cell has been found on a whitelisted frequency. If a cell is not found on a whitelisted frequency, the method 800 may advance to a timer in 840 for a predetermined period, T. T may be controlled by keeping the value of T in non-volatile memory (e.g., memory arrangement 110), which may be overwritten by AP as per need. Specifically, in 840, the timer may be activated and the method 800 may advance to 850. In 850, the processor 105 may determine whether the time period (T) has expired, and the method may return to 830 upon expiration of the time period (T).

Once a cell is found on a whitelisted frequency, in 860 the processor 105 may perform standard access-stratum/non-access-stratum ("AS/NAS") procedures on the new cell.

FIG. 9 shows an exemplary method 900 for performing a split search on the same RAT frequencies according to various embodiments described herein. Typically, the current processes for selection and reselection are limited to searching all bands on a certain RAT continuously before moving onto another RAT. For instance, the current design may search all EUTRAN bands 910, and then all UTRAN bands 920, and then all GERAN bands 930, etc.

According to an exemplary embodiment described in method 900, the whitelisted ("good") frequencies/bands may be grouped separately from the graylisted ("bad") frequencies/bands for the same RAT. Accordingly, the whitelisted frequencies/bands for each of the various RATs may be searched individually prior to performing a search on any of the graylisted frequencies/bands of all the RATS collectively. For instance, the method 900 may search the good frequencies/bands of EUTRAN in 940, then the good frequencies/bands of UTRAN in 950, and the good frequencies/bands of GERAN in 960. Once all of the good frequencies/bands of the different RATS have been search, the method 900 may then advance to search the bad frequencies/bands. For instance, the method 900 may then search the bad frequencies/bands of EUTRAN in 970, then the bad frequencies/bands of UTRAN in 980, and the bad frequencies/bands of GERAN in 990.

In other words, method 900 may identify a first list of available frequencies/bands in a first RAT, such as EUTRAN. The method 900 may sort these available frequencies/bands to de-prioritize a subset of frequencies and bands from the graylist. Accordingly, the search is performed for the whitelisted ("good") frequencies/bands that are not in the subset.

The method 900 may then identify a second list of available frequencies/bands in a second RAT, such as either UMTS or EUTRAN. The method 900 then identifies a second subset of the second list of frequencies/bands based on an operation of the non-cellular wireless communication component of the UE (e.g., the WiFi modem 210, the GNSS receiver 220). After storing the second subset of the list of frequencies/bands in a second graylist, the cellular modem 230 may then perform a second search for one of the system selection and the system reselection in the second RAT based on the second graylist, wherein the search is performed for the frequencies and bands that are not in the second subset. Finally, the cellular modem 230 then performs a further search, after the second search, for one of the system selection and the system reselection in the first RAT using the subset of frequencies and bands.

It may be noted that the exemplary embodiments are described with reference to the EUTRAN and LTE-Advanced communication system. However, those skilled in the art will understand that the exemplary embodiments may be applied to opportunistic system selection and reselection within any wireless communication schemes including those having different characteristics from the EUTRAN scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE"):
      identifying a list of frequencies and bands available to a cellular modem of the UE for one of system selection and system reselection;
      identifying a subset of the list of frequencies and bands based on an operation of a non-cellular wireless communication component of the UE;
      storing the subset of the list of frequencies and bands in a graylist; and
      performing, by the cellular modem, a search for one of the system selection and the system reselection based on the graylist.

2. The method of claim 1, wherein the non-cellular wireless communication component is one of a WiFi modem or a Global Navigation Satellite Systems ("GNSS") receiver.

3. The method of claim 1, further comprising:
   determining, by the UE, that the non-cellular wireless communication component is actively operating; and
   adjusting the subset of the list of frequencies and bands based on the active operation of the non-cellular wireless communication component.

4. The method of claim 1, further comprising:
determining, when the UE is in an idle mode, that the UE is camped on one of the frequencies and bands in the subset; and
performing a background search for the system reselection based on the graylist.

5. The method of claim 4, further comprising:
activating a timer, wherein the background search is initiated when the timer is expired.

6. The method of claim 1, further comprising:
sorting the list of frequencies and bands to de-prioritize the subset of frequencies and bands.

7. The method of claim 1, further comprising:
determining that the UE is to be switched from a first radio access technology ("RAT") to a second RAT;
receiving a priority list of frequencies and bands for the cell reselection from the second RAT; and
modifying the priority list based on the graylist.

8. The method of claim 1, wherein the identifying the list and the identifying the subset is performed for a first radio access technology ("RAT"), the method further comprising:
sorting the list to de-prioritize the subset of frequencies and bands, wherein the search is performed for the frequencies and bands that are not in the subset;
identifying a second list of frequencies and bands available to the cellular modem of the UE for one of system selection and system reselection for a second RAT;
identifying a second subset of the second list of frequencies and bands based on an operation of the non-cellular wireless communication component of the UE;
storing the second subset of the list of frequencies and bands in a second graylist;
performing, by the cellular modem, a second search for one of the system selection and the system reselection in the second RAT based on the second graylist, wherein the search is performed for the frequencies and bands that are not in the second subset; and
performing, by the cellular modem, a further search, after the second search, for one of the system selection and the system reselection in the first RAT using the subset of frequencies and bands.

9. A user equipment ("UE") device comprising:
a cellular modem;
a non-cellular wireless communication component;
a non-transitory memory having a program stored thereon; and
a processor, wherein execution of the program causes the processor to perform operations comprising:
identifying a list of frequencies and bands available to the cellular modem for one of system selection and system reselection; and
sending a subset of the list of frequencies and bands to the cellular modem based on an operation of the non-cellular wireless communication component, wherein the cellular modem:
stores the subset of the list of frequencies and bands in a graylist, and
performs a search for one of the system selection and the system reselection based on the graylist.

10. The UE device of claim 9, wherein the non-cellular wireless communication component is one of a WiFi modem or a Global Navigation Satellite Systems ("GNSS") receiver.

11. The system of claim 9, wherein the processor further performs operations including:
determining that at the non-cellular wireless communication component is actively operating; and
adjusting the subset of the list of frequencies and bands based on the active operation of one of the non-cellular wireless communication component.

12. The system of claim 9, wherein the processor further performs operations including:
determining, when the UE is in an idle mode, that the UE is camped on one of the frequencies and bands in the subset, wherein the cellular modem performs a background search for the system reselection based on the graylist.

13. The system of claim 12, wherein the processor further performs operations including:
activating a timer, wherein the background search is initiated when the timer is expired.

14. The system of claim 9, wherein the processor further performs operations including:
sorting the list of frequencies and bands to de-prioritize the subset of frequencies and bands.

15. The system of claim 9, wherein the processor further performs operations including:
determining that the UE is to be switched from a first radio access technology ("RAT") to a second RAT;
receiving a priority list of frequencies and bands for the cell reselection from the second RAT; and
modifying the priority list based on the graylist.

16. The system of claim 9, wherein the identifying the list and the sending the subset is performed for a first radio access technology ("RAT"), the method further comprising:
sorting the list to de-prioritize the subset of frequencies and bands, wherein the search is performed for the frequencies and bands that are not in the subset;
identifying a second list of frequencies and bands available to the cellular modem of the UE for one of system selection and system reselection for a second RAT;
identifying a second subset of the second list of frequencies and bands based on an operation of the non-cellular wireless communication component of the UE; and
sending the second subset of the list of frequencies and bands in a second graylist to the cellular modem, wherein the cellular modem:
performs a second search for one of the system selection and the system reselection in the second RAT based on the second graylist, wherein the search is performed for the frequencies and bands that are not in the second subset, and
performs a further search, after the second search, for one of the system selection and the system reselection in the first RAT using the subset of frequencies and bands.

17. An integrated circuit, comprising:
circuitry to identify a list of frequencies and bands available to a cellular modem of a user equipment ("UE") for one of system selection and system reselection;
circuitry to identify a subset of the list of frequencies and bands based on an operation of a non-cellular wireless communication component of the UE;
circuitry to store the subset of the list of frequencies and bands in a graylist.

18. The integrated circuit of claim 17, further comprising:
circuitry to determine that at the non-cellular wireless communication component is actively operating; and
circuitry to adjust the subset of the list of frequencies and bands based on the active operation of one of the non-cellular wireless communication component.

19. The integrated circuit of claim 17, further comprising:
circuitry to determine, when the UE is in an idle mode, that the UE is camped on one of the frequencies and bands in the subset, wherein a cellular modem performs a background search for the system reselection based on the graylist.

20. The integrated circuit of claim 19, further comprising:
circuitry to activate a timer, wherein the background search is initiated when the timer is expired.

21. The integrated circuit of claim 17, wherein the identifying the list and the sending the subset is performed for a first radio access technology ("RAT"), the integrated circuit further comprising:
circuitry to sort the list to de-prioritize the subset of frequencies and bands, wherein the search is performed for the frequencies and bands that are not in the subset;
circuitry to identify a second list of frequencies and bands available to the cellular modem of the UE for one of system selection and system reselection for a second RAT;
circuitry to identify a second subset of the second list of frequencies and bands based on an operation of the non-cellular wireless communication component; and
circuitry to send the second subset of the list of frequencies and bands in a second graylist to the cellular modem.

\* \* \* \* \*